United States Patent
Alonzo et al.

(10) Patent No.: US 12,375,360 B1
(45) Date of Patent: Jul. 29, 2025

(54) SMART DETECTION OF DANGER USING SIGNALS DEGRADATION AND ML/AI

(71) Applicant: UIPCO, LLC, San Antonio, TX (US)

(72) Inventors: Edward Manuel Alonzo, San Antonio, TX (US); Paul Joseph Astwood, San Antonio, TX (US); Jeorge Luis Fabre, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 0 days.

(21) Appl. No.: 18/148,263

(22) Filed: Dec. 29, 2022

(51) Int. Cl.
*H04L 41/14* (2022.01)
*H04B 17/309* (2015.01)
*H04W 24/02* (2009.01)
*H04W 24/08* (2009.01)

(52) U.S. Cl.
CPC ......... *H04L 41/145* (2013.01); *H04B 17/309* (2015.01); *H04W 24/02* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 8,989,235 B2 * | 3/2015 | Abdelmonem | ........ | H04B 15/00 455/456.2 |
| 9,271,185 B2 * | 2/2016 | Abdelmonem | ....... | H04W 64/00 |
| 9,319,911 B2 * | 4/2016 | Gupta | .................. | H04W 24/08 |
| 9,345,404 B2 * | 5/2016 | Proud | .................. | A61B 5/0015 |
| 9,426,137 B2 * | 8/2016 | Caceres | ................ | H04W 4/023 |
| 9,544,800 B2 * | 1/2017 | Gupta | ..................... | H04L 43/12 |
| 9,717,017 B2 * | 7/2017 | Backholm | ............. | H04W 28/02 |
| 9,826,349 B1 * | 11/2017 | Yang | ..................... | H04W 4/029 |
| 9,888,399 B2 * | 2/2018 | Gupta | .................... | H04W 28/04 |
| 10,021,590 B2 * | 7/2018 | Backholm | ............. | H04L 47/283 |
| 10,419,274 B2 * | 9/2019 | Stephens | ................. | H04L 67/12 |
| 10,609,586 B2 * | 3/2020 | Carbajal | ............ | H04L 27/0006 |
| 10,641,861 B2 * | 5/2020 | Dupray | ................. | G01S 5/0258 |
| 10,958,508 B2 * | 3/2021 | Stephens | ............ | H04L 41/0672 |
| 11,005,623 B2 * | 5/2021 | Hosseini | ............... | H04L 5/0094 |
| 11,082,869 B2 * | 8/2021 | Carbajal | ............... | H04W 16/14 |
| 11,228,503 B2 * | 1/2022 | Mijumbi | ............... | H04L 41/145 |
| 2014/0247146 A1 * | 9/2014 | Proud | ..................... | H02J 50/10 340/870.02 |
| 2014/0247155 A1 * | 9/2014 | Proud | .................... | A61B 5/681 340/870.01 |
| 2014/0269849 A1 * | 9/2014 | Abdelmonem | ....... | H04L 5/0026 375/148 |
| 2015/0065121 A1 * | 3/2015 | Gupta | ................... | H04W 28/04 455/424 |
| 2016/0004971 A1 * | 1/2016 | Verkasalo | ............... | G06F 16/29 706/12 |
| 2016/0021081 A1 * | 1/2016 | Caceres | ................. | G06F 21/32 726/7 |
| 2016/0057651 A1 * | 2/2016 | Backholm | ......... | H04W 28/0268 370/235 |
| 2017/0208079 A1 * | 7/2017 | Cammarota | ........ | H04L 63/1425 |
| 2017/0339596 A1 * | 11/2017 | Backholm | ............. | H04W 28/02 |
| 2018/0317122 A1 * | 11/2018 | Backholm | ............. | H04W 24/08 |

(Continued)

*Primary Examiner* — Ranodhi Serrao

(74) *Attorney, Agent, or Firm* — BakerHostetler

(57) ABSTRACT

A system for using signal interference information (e.g., interference, strength, distortion, et cetera) associated with wireless devices and other wireless device related information to determine a behavioral pattern or characteristic is disclosed.

19 Claims, 5 Drawing Sheets

(56) References Cited

U.S. PATENT DOCUMENTS

| | | | |
|---|---|---|---|
| 2019/0182105 A1* | 6/2019 | Stephens | H04L 67/535 |
| 2019/0230540 A1* | 7/2019 | Carbajal | H04L 27/00 |
| 2019/0281077 A1* | 9/2019 | Deb | G06F 9/45558 |
| 2019/0327048 A1* | 10/2019 | Hosseini | H04B 7/0697 |
| 2020/0221324 A1* | 7/2020 | Carbajal | H04W 64/006 |
| 2020/0333426 A1* | 10/2020 | Dupray | G01S 5/0258 |
| 2021/0052159 A1* | 2/2021 | Gum | A61B 5/0022 |
| 2021/0103842 A1* | 4/2021 | Hardin | H04W 12/68 |
| 2021/0168042 A1* | 6/2021 | Mijumbi | H04L 43/20 |
| 2021/0319894 A1* | 10/2021 | Sobol | G06N 7/01 |
| 2021/0360454 A1* | 11/2021 | Carbajal | H04W 64/006 |
| 2022/0279364 A1* | 9/2022 | Koral | H04W 48/02 |

* cited by examiner

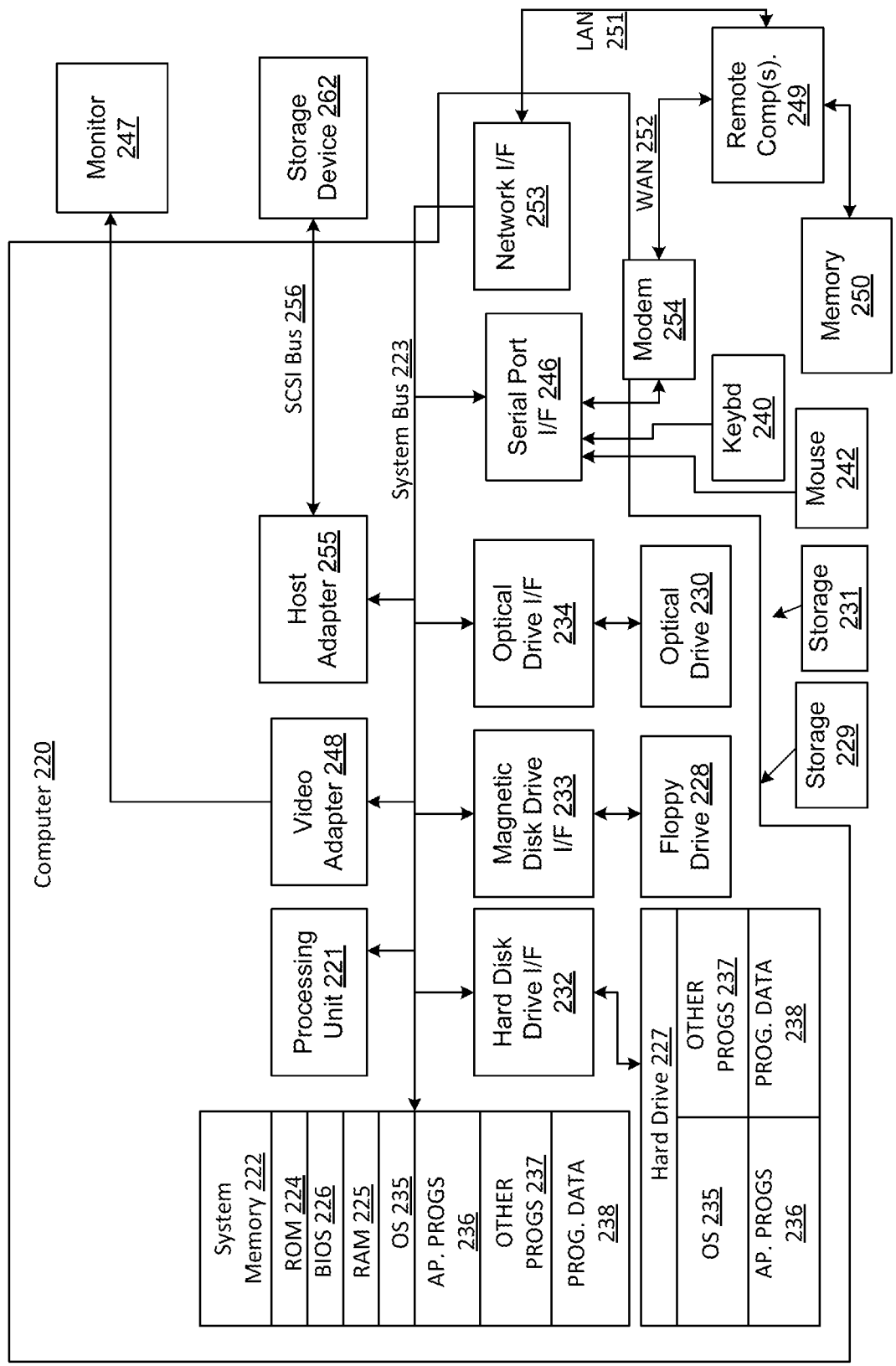

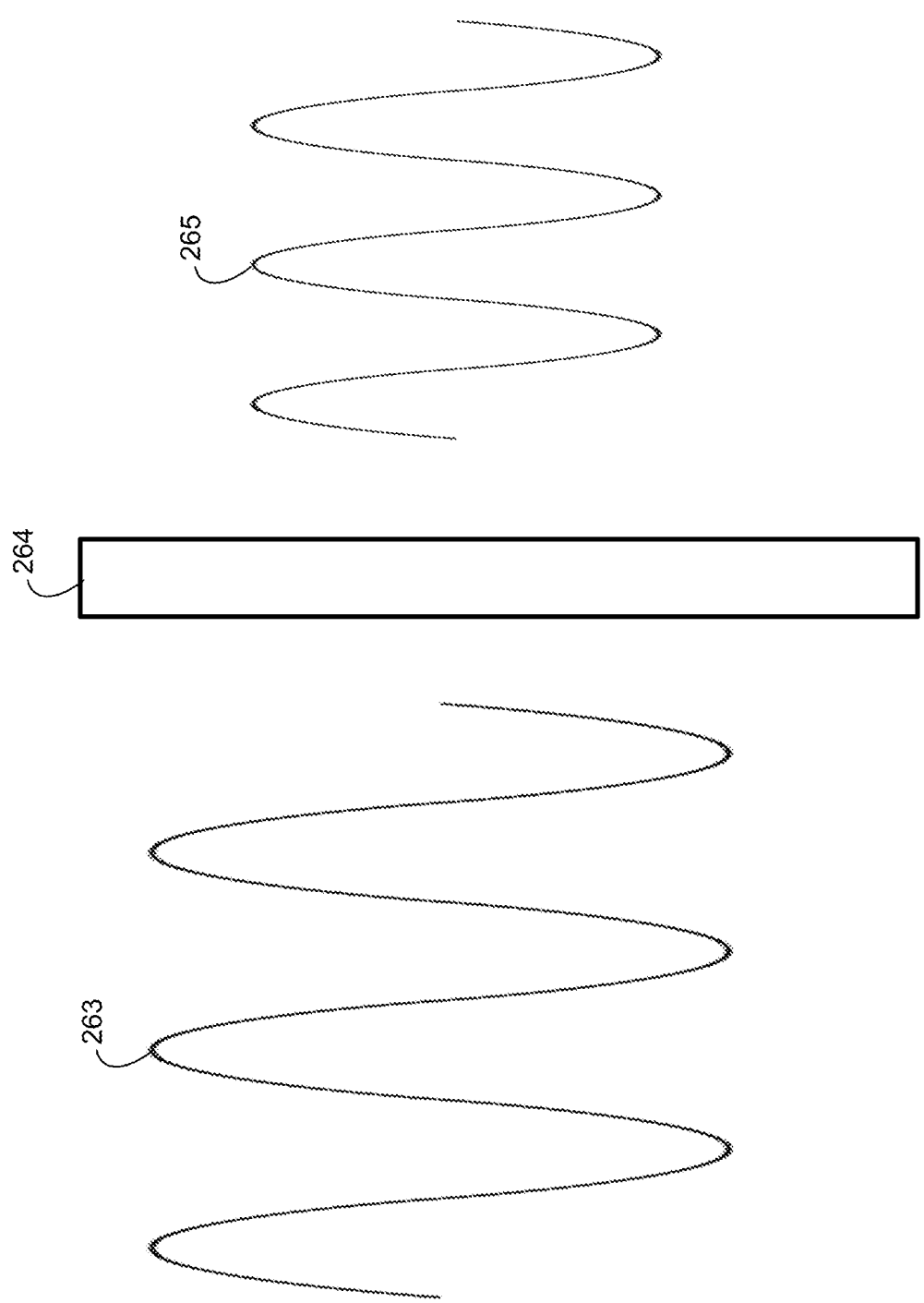

SMART DETECTION OF DANGER USING SIGNALS DEGRADATION AND ML/AI

TECHNICAL FIELD

Systems, apparatuses, or methods for using interference associated with a wireless network as an alternative for conventional sensors.

BACKGROUND

Many forms of object detection, motion detection and activity recognition exist today, including optical and thermal/infrared cameras, passive/active infrared motion detectors, acoustic sensors, vibration sensors, cameras, induction coils, and radio frequency (RF) sensors. These technologies can be useful in applications such as security, home automation, elderly and child monitoring, and others.

One of several challenges of existing object detection, motion detection and activity recognition technologies is the requirement to deploy additional network infrastructure in order to support sensor communication, increasing cost and complexity. Moreover, there is a need to identify damages, impacted entities, or potentially dangerous situations. Conventional technologies for monitoring and detection, if they are even available, can be expensive and burdensome and do not fully utilize data that is already available.

SUMMARY

The disclosed subject matter may utilize measurements of wireless systems (e.g., WiFi, Bluetooth, cell, etc.) and devices that emit or receive signals (including, but not limited to, devices used for communication purposes) to determine a condition or an action by comparing a behavior of a wireless device to a baseline behavior. A wireless system may include one or more base stations and/or one or more mobile devices at one or more locations. In an example, an apparatus may include a processor and a memory coupled with the processor that effectuates operations. The operations may include determining baseline information associated with the wireless device (e.g., EM signals, distances, materials and objects within a house, etc.). Moreover, determining information associated with the wireless devices may include identifying persons and new devices, identifying an emitting device and a transmitting mode, identifying a receiving device and its capabilities, etc.).

A baseline behavior pattern may be determined (e.g., based on the baseline information) for each of the one or more base stations and the one or more mobile devices at the location. The baseline behavior pattern may include regular behavior of the one or more mobile devices. Based on the baseline behavior pattern, a baseline model of the wireless network may be determined. For example, the baseline model may include what reception of a signal should look like at a distance, at an angle, through certain media, etc.

A behavior of a wireless device connected to the wireless network may be compared to the baseline model. Based on the comparison, an action associated with the behavior may be determined. For example, a database, machine learning, and/or an artificial intelligence entity may draw a conclusion about a condition based on deviations from that baseline. Instructions may be sent to smart device and/or persons based on the determined action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 is an exemplary block diagram representing a computer system in which aspects of the methods and systems disclosed herein or portions thereof may be incorporated;

FIG. 4 is an exemplary diagram illustrating attenuation of a wireless signal;

DETAILED DESCRIPTION

Figure 1:
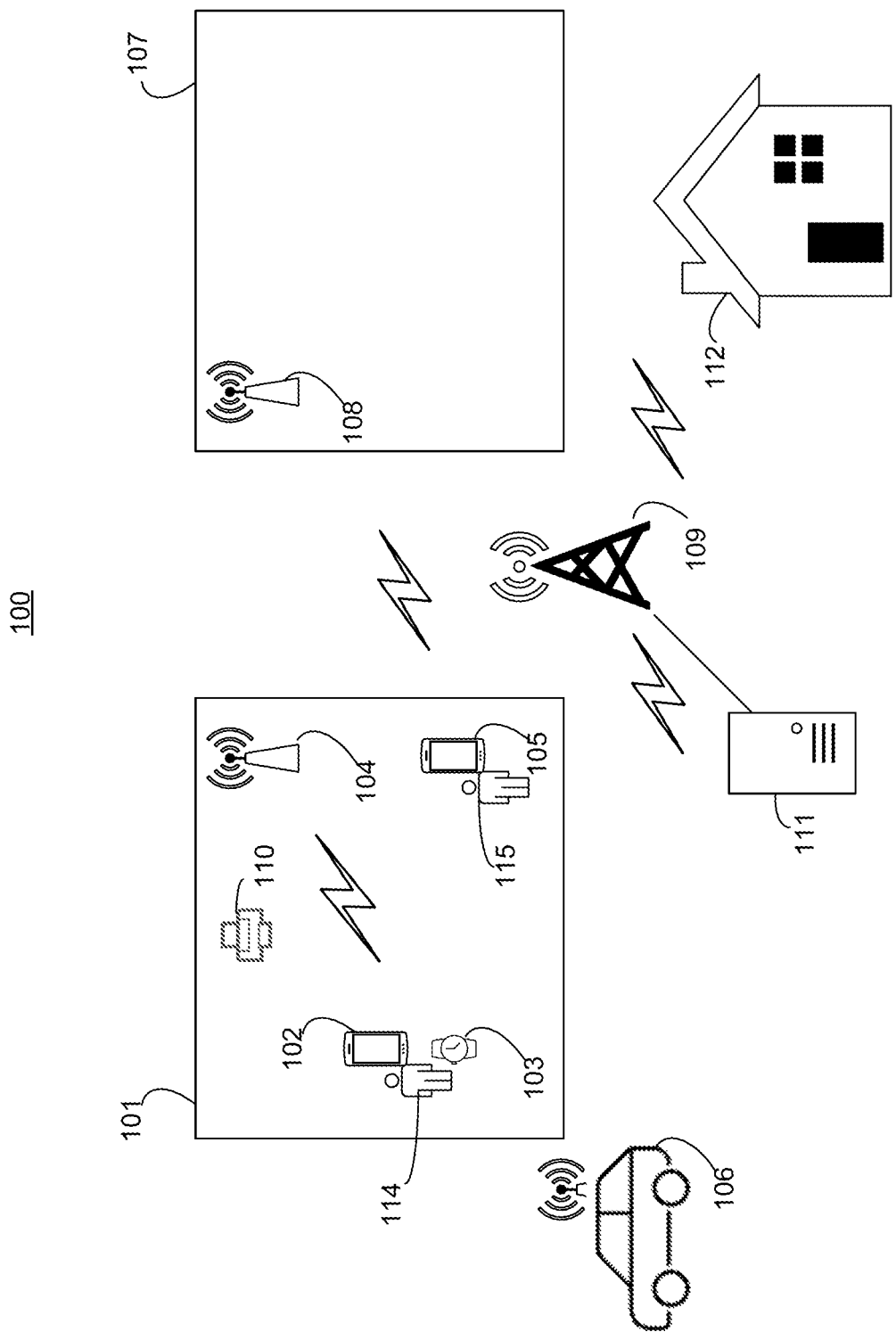
FIG. 1 illustrates an exemplary system that may enable systems for Wi-Fi signals to use interference as an alternative for conventional sensors.

Wireless devices with a plurality of internal sensor are pervasive. Adults, children, residences, business, vehicles, parks, and more may have an associated wireless device ID and signal. Despite the integration of such devices, transmitters and receivers are not conventionally employed to determine a condition, event, change, et cetera, based on the propagation of or change to signals emitted from such transmitters. The technological problem solved by this invention is thus multi-part in that it provides additional information about conditions, changes, statuses, et cetera, using wireless signals, and further employs a wider variety of transmitters and receivers to do so, obviating the need for hard-to-find, hard-to-use, and/or expensive equipment that is conventionally used to perform such analyses, if such equipment is even available. The disclosed subject matter provides for ways in which to use signal information (e.g., interference, strength, distortion, et cetera) associated with wireless devices, and modeling of wireless device related information, to automatically detect and react to conditions, changes, events, et cetera, associated with a user, an object, a property, a device, or an area. The methods herein may be iterative and incorporate machine learning algorithms in order to increase the accuracy of the pattern recognition and description and execution of an action.

Wireless signal information may be used as contextual information about a given environment and the objects within. For example, refraction, reflection, interference (positive or negative), diffraction, absorption and other wave behaviors may provide valuable information. Moreover, with the proliferation of devices that emit signals (personal devices, cellphones, computers, washing machines, cars, edge devices and others), the sheer volume of information that otherwise would be wasted can be harnessed using data analytics (e.g., machine learning, artificial intelligence, and other techniques) with previously unimaginable results.

According to some embodiments, multiple devices may report to a central or distributed system which may create a virtual model of the baseline/current environment. The virtual model may identify signals (strength, frequency, etc.) associated with the environment. Moreover, the virtual model may identify physical properties associated with the environment (e.g., distances, materials, objects, people, and devices within a house, including persons and new devices).

Such patterns cannot often be perceived by humans because the amount of data is overwhelming, the patterns are too subtle or crowded among other patterns, or humans are not capable of receiving and interpreting data from various electronic sensors. Conventional technology to date may look at a limited amount of data available (e.g., using smart phone sensors) but fails to incorporate and synthesize data from other sources. In doing so, patterns or events can be missed, or false positives for patterns and events may be identified when utilization of additional data would avoid such a false positive. This disclosure utilizes unconventional techniques in, e.g., data aggregation and machine learning, to provide a technological improvement overcoming the shortcomings of sensor systems having narrower views or analyzing smaller amounts of data.

The disclosed subject matter may enable the use of refraction, reflection, interference (positive or negative), diffraction, absorption and other wave behaviors associated with wireless signals (e.g., Wi-Fi signals) and other wireless device related information to reduce the need of various external sensors within a residence, business, or other area. FIG. 1 illustrates an exemplary system as disclosed herein. System 100 may include a plurality of structures, such as residence 101, residence 107, or residence 112. Each residence may include a plurality of devices. In an example, residence 101 may include mobile phone 102, smart wearable 103 (e.g., smartwatch, smart ring, or smart glasses), base station 104, printer 110, or mobile device 105, among other devices (e.g., smart displays, smart speakers, etc.). Mobile phone 102 or smart wearable 103 may be associated with user 114 that is linked to a first user profile, while mobile device 105 may be associated with user 115 that is linked to a second user profile. In another example, residence 107 may include base station 108, among other devices (not shown).

System 100 may include a plurality of other devices such as vehicle 106, base station 109, or server 111. Server 111 may receive and analyze wireless device related information in order to predict or determine events. The plurality of devices of system 100 may be communicatively connected with each other via wired or wireless communication. Vehicle 106 may be associated with user 114 and may connect with other devices via wireless communication, such as Wi-Fi or 5G. In an example scenario, vehicle 106, may be an unmanned aerial vehicle or an autonomous terrestrial vehicle (e.g., SAE Intl level 3 to level 5 automation).

The plurality of devices of system 100 may send, receive, or store wireless device information, which may be obtained by a plurality of internal sensors. The stored or communicated information may include signal strength information (e.g., received signal strength indictor—RSSI), wireless device identifier (ID), location information (e.g., GPS information), accelerometer information, barometer information, altimeter information (e.g., altitude), or gyroscope information, among other things. It is contemplated herein that the signal strength or wireless device ID, among other information, may be based on connected devices or discoverable devices. Moreover, wireless device information may include information associated with wireless signals, including refraction, reflection, interference (positive or negative), diffraction, absorption and other wave behaviors. For example, mobile phone 102 may be connected with base station 104 and transfer data, but mobile phone 102 may receive wireless device information from base station 108 (e.g., Wi-Fi) or mobile device 105, which are discoverable and not connected with mobile device 102.

It is contemplated that an area may be inside a building, outside a building or a combination of both. In addition, although Wi-Fi signals are featured herein, other wireless signals (e.g., electromagnetic signals, Bluetooth, cellular, etc.) may be used to implement the same or similar systems.

Figure 2:
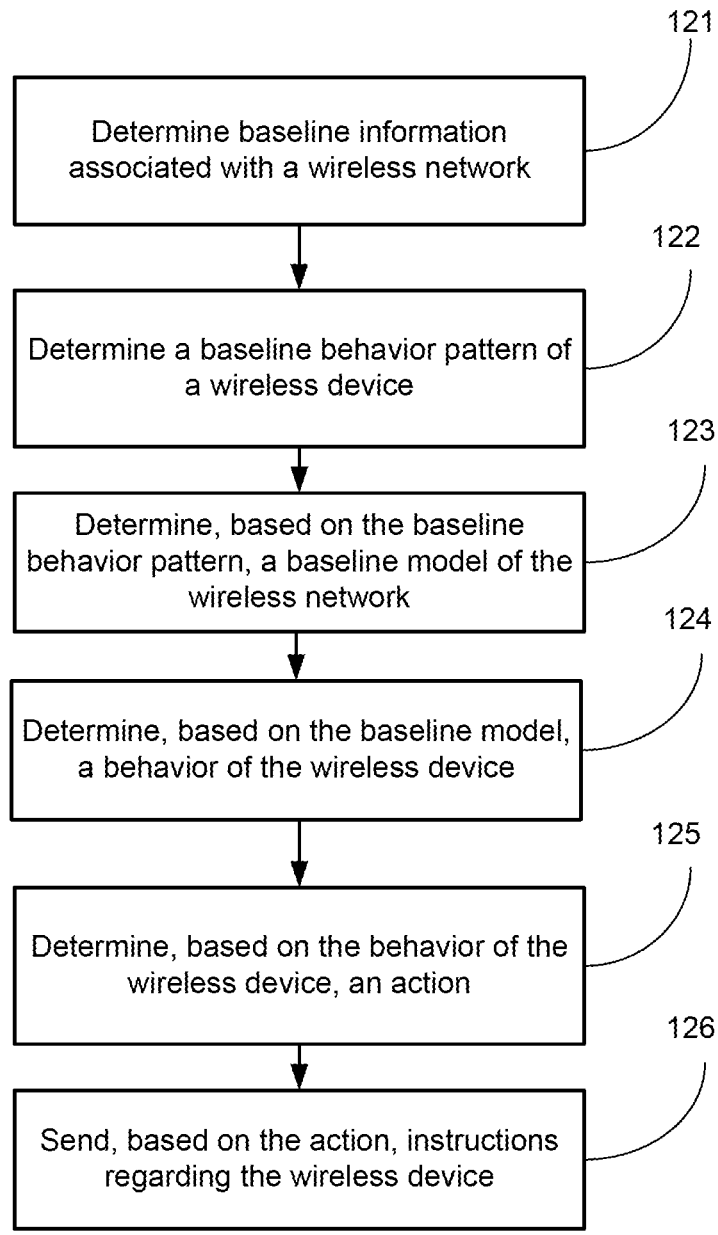
FIG. 2 illustrates an exemplary method that may enable systems for Wi-Fi signals to use measurements of wireless systems and devices that emit or receive signals to determine a condition or an action.

FIG. 2 illustrates an exemplary method that may enable a system to utilize measurements of wireless systems (e.g., WiFi, Bluetooth, cell, etc.) and devices that generally emit or receive signals (including, but not limited to, devices used for communication purposes) to determine a condition or an action as disclosed herein.

At step 121, a device associated with a wireless network (e.g., server 111, base station 104, base station 108, base station 109, etc.) may determine baseline information associated with the wireless network. For example, server 111 may receive wireless device related information associated with residence 101. As disclosed, residence 101 may include smart wearable 103, mobile device 102, mobile device 105, printer 110, or base station 104. As any of the devices or users of the devices moves in or about residence 101 the wireless information associated with the devices may change. Specifically, wave behaviors including refraction, reflection, interference (positive or negative), diffraction, absorption, etc. may change. Moreover, physical properties associated with residence 101 may change over time. These changes in wave behaviors may be used to identify changes associated with residence 101, as well as any inhabitants or devices associated with residence 101. Moreover, baseline information may include identifying one or more emitting devices as well as a transmitting mode associated with each emitting device. Baseline information may also include identifying one or more receiving devices as well as a capability associated with each receiving device.

Moreover, server 111 may receive wireless device related information associated with a plurality of devices which may or may not be located in residence 101. For example, server 111 may receive wireless device related information including Received Signal Strength Indicator (RSSI), such as shown in Table 1, from smart wearable 103. Other wireless device related information from smart wearable 103 may include location information, accelerometer information, barometer information, altimeter information, or gyroscope information, among other things. The wireless device related information may be received over an extended time period.

TABLE 1

| Smart Wearable | | | | |
|---|---|---|---|---|
| Name | RSSI (0 to 100 scale) | Timestamp Connect/ Disconnect | Timestamp Discoverable/ Not | Wireless ID |
| Printer 110 | 85 | t0 | t1 | ID #1 |
| Base Station 104 | 80 | t1 | t1 | ID #2 |
| Base Station 108 | 60 | | t1 | ID #3 |
| Base Station 109 | 50 | | t1 | ID #4 |

TABLE 1-continued

Smart Wearable

| Name | RSSI (0 to 100 scale) | Timestamp Connect/ Disconnect | Timestamp Discoverable/ Not | Wireless ID |
|---|---|---|---|---|
| Mobile Phone 102 | 90 | | t1 | ID #5 |
| Mobile Device 105 | 85 | | t1 | ID #6 |
| Vehicle 106 | 80 | t2 | t1 | ID #7 |

At step 122, server 111 may determine a baseline pattern of one or more devices, users, or networks. For example, server 111 may detect a pattern (e.g., behavior pattern of user 114) based on the wireless device related information. A pattern may be detected by using machine learning and may be based on wireless device related information from one device (e.g., just information obtained by smart wearable 103) or wireless device related information from multiple devices (e.g., obtained from memory of smart wearable 103, mobile device 102, mobile device 105, printer 110, or base station 104). These patterns may be considered triggers or thresholds that may be used to determine behavior that is occurring and what action if any may be executed.

At step 123, a baseline model of the wireless network may be determined based on the baseline behavior pattern. For example, the baseline model of the wireless network may include one or more of what reception of a signal should look like at a distance, at an angle, through certain media, etc. In addition to the wireless device related information disclosed above, the baseline model may include one or more of electronic calendar information, SMS information, or electronic mail information used with the other wireless device related information. Natural and artificial interference both permanent and transient (e.g., weather, solar flares, et cetera) can be included. Moreover, at step 123, the wireless device related information, patterns, pattern descriptions, or other information may be anonymized and saved in the baseline model. A machine learning analysis may be utilized to help develop the baseline model.

At step 124, server 111 may determine, based on the baseline model, a behavior of the device. A behavior of a wireless device connected to the wireless network may be compared to the baseline model. A database, machine learning, and/or an artificial intelligence entity may draw a conclusion about a condition based on deviations from that baseline. For example, server 111 may monitor received wireless device information and compare the received wireless device information to the baseline model to detect whether a pattern threshold event has occurred, which may be during a period subsequent to step 124.

At step 125, based on the behavior or the comparison, an action associated with the behavior may be determined. As disclosed herein, an action may be an alert sent to one or more devices. The alert may include, for example, warning message for an undesirable user (e.g., user 115) near user 114, welfare check message regarding user 114, an indication that a party (or like social gathering) may be occurring at residence 101 (e.g., several confirmed connections through base station 104 when user 114 is out of town), update an electronic calendar, communicate (text/call/email) emergency contact, or communicate other unusual activity around residence 101 or unusual activity around user 114 (e.g., near or away from residence 101).

At step 126, instructions may be sent to smart device and/or persons based on the determined action. Moreover, at step 126, server 111 may execute the determined action from step 125.

In a first scenario (e.g., at step 121), server 111 may detect a wave associated with a wireless signal, e.g., a smart television connection to base station 104. Moreover, it may be detected (e.g., at step 122 and/or step 123) that a first percentage of the wave reflects on a concrete foundation of residence 101, e.g., a reflection rate and then the wave degrades by a second percentage, e.g., a degradation rate. Should a crack in the foundation of residence 101 exist, the reflection rate may decrease and the degradation rate may increase (e.g., at step 124). If there are multiple signals (e.g., one signal from the smart television and another signal from smart wearable 103), one wave may not be significantly impacted by the crack and another wave may be more impacted. It may be determined (e.g., at step 125) that a repair to the crack should be made and instructions may be sent (e.g., at step 126) with details regarding the repair.

In another scenario, if a stream of water starts occurring behind a wall of residence 107, existing wave patterns between base station 108 and base station 109 may be altered. One or more of server 111, base station 108, base station 109, or any other device within range may detect the changes in the existing wave patterns (e.g., at step 124). In one example, a device may for the first time be able to receive waves from another device and such a change in wireless reception may be used to detect property damages.

Moreover, waves may be impacted by other radiation sources such as fire, and increased temperature. In a community setting information associated with wireless networks and wireless devices could be used to identify grass fires or locations of potential danger. For example, search and rescue teams could setup amplifiers and devices that send/receive while searchers carrying other devices traverse a given range seeking lost hikers. As another example, searchers may leverage signals associated with a remote network between their respective personal devices (e.g., on a first pass) while larger systems are being established.

In a first scenario, server 111 may determine baseline information (e.g., at step 121) associated with base station 104 and including one or more of a smart television connection to base station 104, a connection of smart wearable 103 in family room of residence 101, and a connection of printer 110 in a study of residence 101. Server 111 may determine a baseline behavior pattern (e.g., at step 122) of the wireless devices in communication with base station 104. Server 111 may determine (e.g., at step 123), based on the baseline behavior pattern, a baseline model of the wireless network (e.g., utilizing data analytics tools including machine learning or artificial intelligence).

For example, server 111 (e.g., or any other connected device) may create a virtual model of the environment. The virtual model may include properties associated with the one or more of the signals associated with the environment (e.g., smart television connection to base station 104, connection of smart wearable 103 in family room of residence 101, and connection of printer 110 in study of residence 101). Moreover, data analytics utilizing a machine learning algorithm or artificial intelligence may be used to develop the virtual model or compare the virtual model with behaviors of the connected devices. For example, the virtual model may include typical interference associated with one or more signals associated with the environment.

A behavior may be detected (e.g., interference associated with a connection of printer 110 in study of residence 101) and the behavior may be compared with the virtual model. If the behavior matches the virtual model, it may be determined that the behavior is normal or typical and no action may take place. However, if the behavior does not comport with the virtual model, the behavior may be classified as abnormal or atypical and an action may take place. For example, server 111 may detect (e.g., at step 124), on a Friday night, abnormal behavior of one or more of the smart television connection to base station 104, the connection of smart wearable 103 in family room of residence 101, and the connection of printer 110 in the study of residence 101.

Based on the abnormal behavior, server 111 may determine (e.g., at step 125) to send an alert message. The alert message may be sent (e.g., at step 126) to smart wearable 103. The alert may be to warn user 114 associated with smart wearable 103 of a possible intruder or trespasser within or near residence 101. This alert may include a request for instructions, such as whether to call public safety (e.g., police), to label the unknown device (e.g., best friend, burglar, or stalker), or to label the event (e.g., movie night or trespasser). In this example, it may just be a "movie night with a friend" and this may be automatically and proactively be added to an electronic calendar based on machine learning.

In addition to being added to the electronic calendar of user 114, tailored advertisements (e.g., an offer to deliver popcorn or the like foods) may be sent to smart wearable 103 and the previously unknown device, when detected in similar situations. Alternatively, there may be an intruder in residence 101. Here, information (e.g., wireless device ID) may be saved about the intruder's device (e.g., user 115 with mobile device 105) and by using machine learning determine that the description should be "intruder alert," which may cause emergency personnel to immediately to be contacted or certain devices to be activated (e.g., an alarm, light, or camera). In an example, there may be a direction or other pattern information which intruders or trespassers may approach residence 101 (e.g., from the backyard instead of the front yard).

The disclosed subject matter may assist in reducing the number of separate sensors in a residence, business, or other area. For example, much of the information, as disclosed, is received from mobile devices, base stations, or the like. Event descriptions may be extrapolated just from wireless device related information, or the use of wireless device related information and other external sensor information. In an example, wireless device signal information may trigger a device (e.g., camera, light, audio alarm, door locks) to be proactively activated (e.g., awaken from a sleep mode or another alert position). With regard to a camera, the camera may be activated in order to capture video or audio.

Although Wi-Fi based systems are disclosed herein, it is contemplated that some of the subject matter may be implemented without the use of Wi-Fi technology in the manner described. The disclosed subject matter may be used for Wi-Fi, Bluetooth, 5G, or other wireless scenarios. The disclosed subject matter may be used for detecting trespassers during evacuation, monitoring homes while a family has indicated they are on vacation, monitoring businesses (patterns may be related to the type of business), or ensuring all expected members are out of residence 101 during an evacuation, among other things. As disclosed, the system may use data analytics (e.g., machine learning or artificial intelligence) to assist with monitoring the wireless related information, storing the wireless related information, and determining which action to execute. The disclosed subject matter may be used for general security of a location or specifically tailored security, particularly during periods where sensitive transactions scenarios are taking place. It is contemplated herein that wireless device related information may vary based on the type of wireless device, such as mobile phone, M2M sensor/thermostat, laptop, desktop, LAN base station, WAN base station, smart speaker, smart display, etc.

The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth. In addition, the use of the word "or" is generally used inclusively unless otherwise provided herein.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that system 100 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 100, or portions thereof, may be stored in a remote memory storage device such as storage medium. Computing devices may communicate over networks through one or more communications links formed between data interfaces. Communication links may comprise either wired or wireless links. It is to be appreciated that the illustrated network connections in the figures (e.g., FIG. 1 or FIG. 3) are exemplary and other ways of establishing a communications link between multiple devices may be used.

FIG. 3 and the following discussion are intended to provide a brief general description of a suitable computing environment in which the methods and systems disclosed herein, or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips, or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices. It is contemplated that the disclosed steps associated with different Figures may be combined. Also, the steps may be distributed over multiple devices or performed primarily on one device.

FIG. 3 is a block diagram representing a computer system in which aspects of the methods and systems disclosed herein and/or portions thereof may be incorporated. As shown, the exemplary general purpose computing system includes a computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random-access memory (RAM) 225. A basic input/output system 226 (BIOS), containing the basic routines that help to transfer information between elements within the computer 220, such as during start-up, is stored in ROM 224.

The computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the computer 220. As described herein, computer-readable media is a tangible, physical, and concrete article of manufacture and thus not a signal per se.

Although the exemplary environment described herein employs a hard disk, a removable magnetic disk 229, and a removable optical disk 231, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random-access memory (RAM), a read-only memory (ROM), and the like.

A number of program modules may be stored on the hard disk, magnetic disk 229, optical disk 231, ROM 224 or RAM 225, including an operating system 235, one or more application programs 236, other program modules 237 and program data 238. A user may enter commands and information into the computer 220 through input devices such as a keyboard 240 and pointing device 242. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a computer may include other peripheral output devices (not shown), such as speakers and printers. The exemplary system of FIG. 3 also includes a host adapter 255, a Small Computer System Interface (SCSI) bus 256, and an external storage device 262 connected to the SCSI bus 256.

The computer 220 may operate in a networked environment using logical connections to one or more remote computers, such as a remote computer 249. The remote computer 249 may be a personal computer, a server, a router, a network PC, a peer device or other common network node, and may include many or all of the elements described above relative to the computer 220, although only a memory storage device 250 has been illustrated in FIG. 3. The logical connections depicted in FIG. 3 include a local area network (LAN) 251 and a wide area network (WAN) 252. Such networking environments are commonplace in offices, enterprise-wide computer networks, intranets, and the Internet.

When used in a LAN networking environment, the computer 220 is connected to the LAN 251 through a network interface or adapter 253. When used in a WAN networking environment, the computer 220 may include a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

Computer 220 may include a variety of computer readable storage media. Computer readable storage media can be any available media that can be accessed by computer 220 and includes both volatile and nonvolatile media, removable and non-removable media. By way of example, and not limitation, computer readable media may comprise computer storage media and communication media. Computer storage media include both volatile and nonvolatile, removable, and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 220. Combinations of any of the above should also be included within the scope of computer readable media that may be used to store source code for implementing the methods and systems described herein. Any combination of the features or elements disclosed herein may be used in one or more examples.

Signal attenuation in wireless networking is a weakening or loss of signal strength during transmission. Signal attenuation may be a natural consequence of signal transmission over long distances and can be used to determine a distance static or changing distance between multiple devices in wireless communication with each other. Attenuation also occurs as a wireless signal travels through a medium (e.g., air, a wall, water, etc.). An amount of attenuation may be used as an indicator regarding the medium through which a wireless signal traverses. For example, attenuation may decrease as the structural integrity of a wall decreases. As another example, attenuation may increase if water starts to flow across a medium that was previously dry. As illustrated in FIG. 4, a signal 263 may travel through a medium 264 (e.g., a wall). Attenuated signal 265 may represent the result of signal 263 propagating through medium 264. For example, attenuated signal 265 may have a different amplitude and/or frequency when compared to signal 263.

Figure 5B:
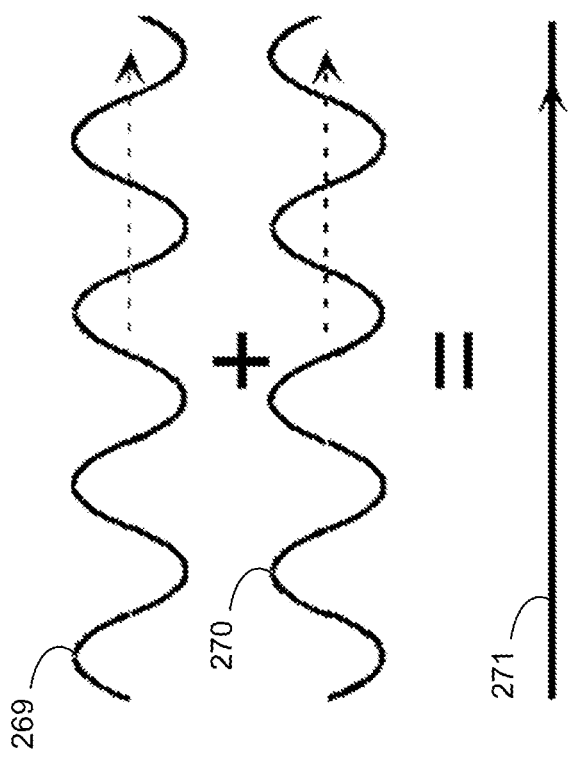
FIG. 5B is an exemplary diagram illustrating destructive interference of a wireless signal.
Figure 5A:
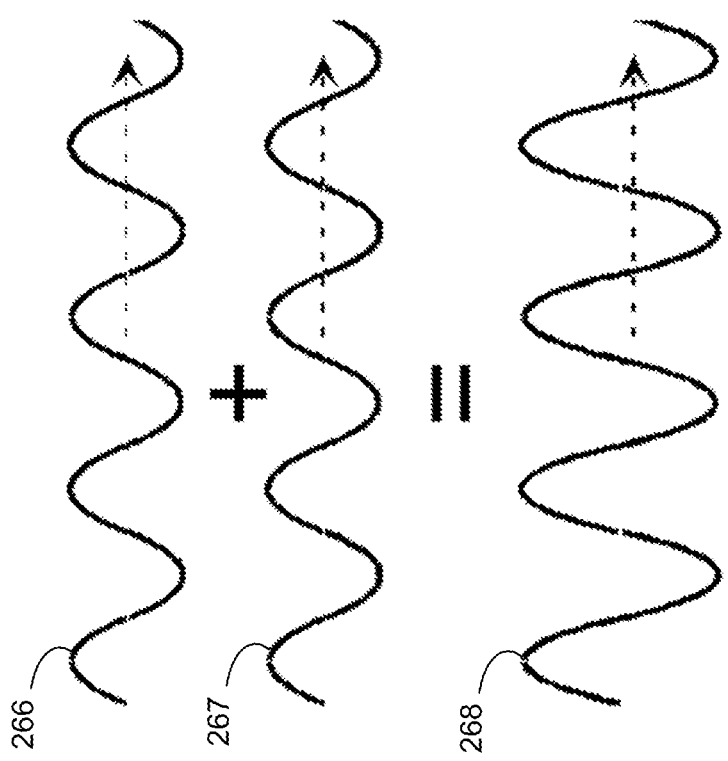
FIG. 5A is an exemplary diagram illustrating constructive interference of a wireless signal.

As signals from multiple devices travel through each other, interference may result. This interference may be used to model or determine physical relationships (e.g., proximity or position) with respect to each other. As illustrated in FIGS. 5A and 5B, two or more waves traveling in the same medium at the same time may interfere with each other and, when the waves meet, the net displacement of the medium is the sum of the individual wave displacements.

As illustrated in FIG. 5A, constructive interference of signal 266 and signal 267 occurs where the peaks, cross over each other. In other words, when two waves are in phase, they interfere constructively. The resulting signal 268 is the sum of signal 266 and signal 267.

As illustrated in FIG. 5B, destructive interference of signal 269 and signal 270 occurs where the two waves are completely out of phase. In other words, when two waves are out-phase phase by 180 degrees or 7L radians, they interfere destructively and cancel each other out (e.g., resulting signal 271).

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for enabling geofences using satellite systems. A method, system, computer readable storage medium, or apparatus may provide for monitoring wireless signal data (e.g., patterns) within a residence; monitoring other data from the residence (e.g., mobile phone use); correlating wireless signal data and other data to determine behavior; monitoring the wireless signal data to detect an incident (e.g., event); and executing an action related to the incident. A method, system, computer readable storage medium, or apparatus may provide for receiving first wireless device related information associated with one or more base stations or one or more mobile devices at a location; correlating the wireless device related information associated with the one or more base stations and the one or more mobile devices at the location to determine a behavior pattern; determining an event based on the behavior pattern; and executing an action related to the event. The event may be indicative of a heath related issue of a user associated with the one or more mobile devices, wherein the action comprises sending an alert to emergency personnel. The behavior pattern may be indicative of a trespasser at the location. The action may include activating a camera or light at the location. The alert may be disable or shutdown some or all functionality of a device of a trespasser. All combinations in this paragraph (including the removal or addition of steps) are contemplated in a manner that is consistent with the other portions of the detailed description.

What is claimed is:
1. An apparatus comprising:
a processor; and
memory coupled with the processor, the memory storing executable instructions that when executed by the processor cause the processor to effectuate operations comprising:
receiving, from one or more base stations at one or more respective base station locations and one or more mobile devices at one or more respective mobile device locations, signal information associated with emission and reception of a plurality of wireless signals among the one or more base stations and the one or more mobile devices, wherein the respective base station locations and the respective mobile device locations are in an area, and wherein the signal information includes signal strength information, location information, and wave behavior information;
determining, based on the signal information, a baseline behavior pattern for each of the one or more base stations and the one or more mobile devices, wherein the baseline behavior pattern describes expected signal strength information and wave behavior information based on locations of an emitter and a receiver in the area;
generating, based on the baseline behavior pattern, a baseline model of a wireless network in communication with the one or more base stations and the one or more mobile devices, wherein the baseline model is determined using one or more physical relationships of the one or more base stations at the one or more respective base station locations and the one or more mobile devices at the one or more respective mobile device locations during a plurality of periods of timer and a transient condition causing a change to the baseline behavior pattern during one of the plurality of periods of time;
determining, based on a deviation from the baseline model, a condition associated with the area; and
determining an action based on the condition,
wherein the baseline behavior describes expected signal strength information and wave behavior based on an angle between the emitter and the receiver.

2. The apparatus of claim 1, the operations further comprising updating the baseline model based on the behavior of one of the mobile devices connected to the wireless network.

3. The apparatus of claim 1, wherein the signal information comprises one or more of electromagnetic signals, distances, materials, and objects associated with the area.

4. The apparatus of claim 1, wherein receiving the signal information comprises identifying an emitting device and a transmitting mode associated with the emitting device.

5. The apparatus of claim 1, wherein receiving the signal information comprises identifying a receiving device and a capability associated with the receiving device.

6. The apparatus of claim 1, wherein the baseline behavior pattern comprises regular behavior of the each of the one or more base stations and the one or more mobile devices in the area.

7. The apparatus of claim 1, wherein the baseline behavior pattern comprises abnormal behavior of the each of the one or more base stations and the one or more mobile devices in the area.

8. The apparatus of claim 1, wherein the baseline model comprises one or more characteristics associated with a signal received from at least one of the one or more base stations and the one or more mobile devices in the area.

9. The apparatus of claim 8, wherein the one or more characteristics are associated with one or more of a distance of reception, an angle of reception, and a media of transmission.

10. The apparatus of claim 1, wherein the baseline behavior describes expected signal strength information and wave behavior based on media between the emitter and the receiver.

11. A method comprising:
receiving, from one or more base stations at one or more respective base station locations and one or more mobile devices at one or more respective mobile device locations, signal information associated with emission and reception of a plurality of wireless signals among the one or more base stations and the one or more mobile devices, wherein the respective base station locations and the respective mobile device locations are in an area, and wherein the signal information includes signal strength information, location information, and wave behavior information;
determining, based on the signal information, a baseline behavior pattern for each of the one or more base stations and the one or more mobile devices, wherein the baseline behavior pattern describes expected signal strength information and wave behavior information based on locations of an emitter and a receiver in the area;
generating, based on the baseline behavior pattern, a baseline model of a wireless network in communication with the one or more base stations and the one or more mobile devices, wherein the baseline model is determined using one or more physical relationships of the one or more base stations at the one or more respective base station locations and the one or more mobile devices at the one or more respective mobile device locations during a plurality of periods of time and a transient condition causing a change to the baseline behavior pattern during one of the plurality of periods of time;
determining, based on a deviation from the baseline model, a condition in the area; and
determining an action based on the condition, wherein the baseline behavior describes expected signal strength information and wave behavior based on an angle between the emitter and the receiver.

12. The method of claim 11, the method further comprising updating the baseline model based on the behavior of one of the mobile devices connected to the wireless network.

13. The method of claim 11, wherein the signal information comprises one or more of electromagnetic signals, distances, materials, and objects associated with the area.

14. The method of claim 11, wherein receiving the signal information comprises identifying an emitting device and a transmitting mode associated with the emitting device.

15. The method of claim 11, wherein receiving the signal information comprises identifying a receiving device and a capability associated with the receiving device.

16. The method of claim 11, wherein the baseline behavior pattern comprises regular behavior of the each of the one or more base stations and the one or more mobile devices in the area.

17. The method of claim 11, wherein the baseline behavior pattern comprises abnormal behavior of the each of the one or more base stations and the one or more mobile devices in the area.

18. The method of claim 11, wherein the baseline model comprises one or more characteristics associated with a signal received from at least one of the one or more base stations and the one or more mobile devices in the area.

19. A non-transitory computer-readable medium storing computer-executable instructions that, when executed by one or more processors, cause:
receiving, from one or more base stations at one or more respective base station locations and one or more mobile devices at one or more respective mobile device locations, signal information associated with emission and reception of a plurality of wireless signals among the one or more base stations and the one or more mobile devices, wherein the respective base station locations and the respective mobile device locations are in an area, and wherein the signal information includes signal strength information, location information, and wave behavior information;
determining, based on the signal information, a baseline behavior pattern for each of the one or more base stations and the one or more mobile devices, wherein the baseline behavior pattern describes expected signal strength information and wave behavior information based on locations of an emitter and a receiver in the area at the location, wherein the baseline behavior pattern is based on the reception of the wireless signals;
generating, based on the baseline behavior pattern, a baseline model of a wireless network in communication with the one or more base stations and the one or more mobile devices, wherein the baseline model is determined using one or more physical relationships of the one or more base stations at the one or more respective base station locations and the one or more mobile devices at the one or more respective mobile device locations during a plurality of periods of time and a transient condition causing a change to the baseline behavior pattern during one of the plurality of periods of time;
determining, based on a deviation from the baseline model, a condition in the area; and
determining an action based on the condition, wherein the baseline behavior describes expected signal strength information and wave behavior based on an angle between the emitter and the receiver.

\* \* \* \* \*